UNITED STATES PATENT OFFICE.

GEORGE WANDREY AND RUDOLPH J. SCHIMPER, OF JERSEY CITY, NEW JERSEY, ASSIGNORS TO ABRAHAM K. LISSBERGER, OF NEW YORK, N. Y.

ARTIFICIAL FUEL.

SPECIFICATION forming part of Letters Patent No. 367,014, dated July 19, 1887.

Application filed May 6, 1887. Serial No. 237,359. (No specimens.)

*To all whom it may concern:*

Be it known that we, GEORGE WANDREY and RUDOLPH J. SCHIMPER, citizens of the United States, residing at Jersey City, in the county of Hudson and State of New Jersey, have jointly invented a new and useful Improvement in Artificial Fuel, of which the following is a specification.

Our invention relates to composite fuel; and it consists of a new composition of matter composed of the ingredients as hereinafter described, and specifically pointed out in the claims.

In carrying out our invention we take, by preference, vegetable charcoal (although coke or any analogous porous carbonaceous substance may be substituted therefor and be within the scope of our invention) and impregnate it with chemical ingredients in the proportions as follows: To one hundred pounds of lump charcoal or its equivalent we employ five pounds of sugar of lead and four ounces of flume alum. The sugar of lead and flume alum are first unitedly dissolved and the charcoal or its equivalent is then thrown into the solution. When the carbonaceous substance is thoroughly impregnated with the solution, it is ready for use, and it will burn without flame, odor, or evolution of gas. The flume alum and sugar of lead retard combustion of the carbonaceous material and arrest the evolution of gas. We thus produce composite fuel that can be used for various purposes, especially in portable heaters for carriages, sad-irons, foot-warmers, cooking-stoves, &c.

It is our intention to prepare our composite fuel for commerce and use in pieces of convenient size, that will slowly burn in ordinary atmosphere and emit a given amount of heat, according to the quantity placed in the vessel therefor.

Having thus described our invention, what we claim, and desire to secure by Letters Patent, is—

1. A composite fuel composed of carbonaceous material impregnated with sugar of lead and flume alum, substantially as described.

2. The within-described composition of matter, consisting of charcoal or analogous carbonaceous material impregnated with a solution of sugar of lead and flume alum in the following proportions in weight, to wit, one hundred pounds of carbonaceous material, five pounds of sugar of lead, and four ounces of flume alum, substantially as described.

GEO. WANDREY.
RUD. J. SCHIMPER.

Witnesses as to Geo. Wandrey:
SAML. H. JACOBSON,
ANSON S. TAYLOR.

Witnesses as to Rud. J. Schimper:
CHAS. P. NICOLL,
HART B. SOLOMON.